US006310162B1

(12) United States Patent
Bos et al.

(10) Patent No.: US 6,310,162 B1
(45) Date of Patent: Oct. 30, 2001

(54) OPHTHALMIC LENSES

(75) Inventors: Willem Bos, Arnhem; Ricardo Henry Breeveld, Doesburg; Marjan Elisabeth Van Der Zanden, Deventer, all of (NL)

(73) Assignee: Great Lakes Chemical Corporation, Indianapolis, IN (US)

( * ) Notice: Subject to any disclaimer, the term of this patent is extended or adjusted under 35 U.S.C. 154(b) by 0 days.

(21) Appl. No.: 09/539,483

(22) Filed: Mar. 30, 2000

Related U.S. Application Data

(63) Continuation of application No. PCT/EP98/06039, filed on Sep. 17, 1998.

(30) Foreign Application Priority Data

Sep. 30, 1997 (EP) .................................. 97203005

(51) Int. Cl.⁷ .................................. C08F 18/24
(52) U.S. Cl. .................. 526/314; 526/319; 526/321; 526/323.2
(58) Field of Search .................. 526/314, 319, 526/321, 323.2

(56) References Cited

U.S. PATENT DOCUMENTS 5,663,279   9/1997   Kuiper et al. .................. 528/196

FOREIGN PATENT DOCUMENTS

| 114080 | 7/1984 | (EP) | C08F/263/06 |
|---|---|---|---|
| 302537 | 2/1989 | (EP) | C08F/218/00 |
| 593877 | 4/1994 | (EP) | G02B/1/04 |
| 96/24865 | 8/1996 | (WO) | G02B/1/04 |

*Primary Examiner*—Helen L. Pezzuto
(74) *Attorney, Agent, or Firm*—Richard P. Fennelly

(57) ABSTRACT

The invention relates to an ophthalmic lens comprising the cured product of a composition comprising:

60–99 wt % of a poly(allyl carbonate) of a polyhydroxy alcohol, said polyhydroxy alcohol having from 2 to 20 carbon atoms and from 2 to 6 hydroxy groups in the molecule;

0.01–10 wt % of at least one radical initiator;

0–20 wt % of comonomers; and a cyclohexyl diallyl ester oligomer in an amount of 0.05 to 60 wt %, having the formula I

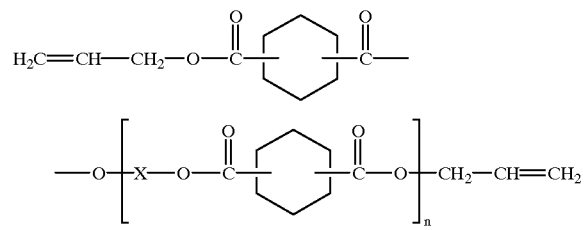

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100.

12 Claims, No Drawings

OPHTHALMIC LENSES

The present invention is a continuation of International Patent Application No. PCT/EP98/06039, filed on Sep. 17, 1998 and claims priority of European Patent Application No. 97203005.0, filed on Sep. 30, 1997.

The present invention relates to ophthalmic lenses, a process for the production of ophthalmic lenses, and the use of cyclohexyl diallyl ester oligomers in ophthalmic lenses.

Recently, organic glass has begun to replace inorganic glass in optical elements, such as windows, prisms, cameras, television screens, telescopes, and ophthalmic lenses. The term ophthalmic lenses refers to corrective lenses as well as non-corrective lenses such as sunglasses. Organic glass possesses several favourable characteristics, including a lighter weight and better safety, e.g., better impact resistance, than inorganic glass.

Conventional materials used in organic glass include polystyrene resin, polymethyl methacrylate resin, and polycarbonate resin. However, these polymers have their respective disadvantages. For example, polymethyl methacrylate resin is liable to high moisture absorption which changes its shape and refractive index. Also, polystyrene resin and polycarbonate resin have the disadvantage of giving rise to birefringence, light scattering, and loss of transparency with time. Furthermore, polymethyl methacrylate and polystyrene are neither scratch nor solvent resistant. Organic glass made up of the products of the radical polymerization of poly(allyl carbonates) of polyhydroxy alcohols is also known, for example from European patent application 0 473 163. These polymers do not have the above-mentioned problems. However, when applying poly(allyl carbonates) of polyhydroxy alcohols in ophthalmic lenses another problem occurs, that of mould damage.

Understood by mould damage is the damage incurred in a lens on opening of the mould wherein the lens is formed. WO 96/24865 from the applicant teaches the use of diallyl phthalate type oligomers in curing compositions for ophthalmic lenses whereby mould damage in the production of said lenses is reduced.

An object of the present invention is to provide an improved ophthalmic lens which can be produced without a significant amount of mould damage. The present invention relates to an ophthalmic lens comprising the cured product of a composition comprising:

60–99 wt % of a poly(allyl carbonate) of a polyhydroxy alcohol, said polyhydroxy alcohol having from 2 to 20 carbon atoms and from 2 to 6 hydroxy groups in the molecule;

0.01–10 wt % of at least one radical initiator;

0–20 wt % of comonomers; and a cyclohexyl diallyl ester oligomer in an amount of 0.05 to 60 wt %, having the formula I

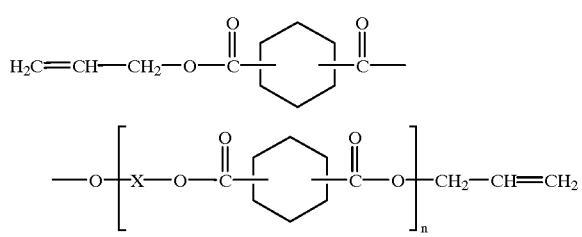

wherein X denotes a divalent hydrocarbon residue derived from a diol having 2–20 carbon atoms, optionally partly replaced by a residue derived from a polyol having 3 or more carbon atoms and 3–10 hydroxy groups, and wherein n=1–100.

The mould damage in the production of the ophthalmic lens according to the present invention is reduced without the other properties such as hardness and refractive index of the lens being significantly affected.

Moulds used in today's industry to prepare ophthalmic lenses from poly(allyl carbonate) of a polyhydroxy alcohol are only suited for compositions which result in ophthalmic lenses with comparable determined indices. A change in refractive index will result in a change in power of the lens when utilizing these moulds. Compositions resulting in high refractive index lenses will require different moulds to obtain ophthalmic lenses with the same power. So, improvement of the properties of lenses by introducing certain oligomers and, optionally, comonomers cannot be achieved without limiting the refractive index of the resulting lens so that the moulds do not have to be changed.

Furthermore, lenses according to the present invention exhibit a low degree of shrinkage. Certain lens types build up internal stress caused by the geometry of the curvatures. This is especially seen with high plus lenses, although other lens types may also suffer from problems related to stress build up during curing. Reduction of shrinkage is a tool for reducing a number of defects caused by stress build up. Examples are: premature-release of the lenses from the moulds, cracking during curing or demoulding and various types of tinting failures observed after lens production.

Preferably, the refractive index of the ophthalmic lenses of the present invention ranges from 1.497 to 1.499.

The cyclohexyl diallyl ester is preferably poly[oxy(methyl-1,2-ethanediyl)oxycarbonyl 1,4-cyclohexylcarbonyl] α-[4-((2-propenyloxy)carbonyl)benzoyl]ω-(2-propenyloxy), i.e. the oligomer of formula I, wherein X denotes methyl-1,2-ethanediyl,

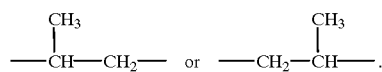

According to a second aspect of the present invention there is provided a process for the preparation of the above ophthalmic lenses, comprising the step of polymerization casting of a curable composition comprising:

60–99 wt % of at least one poly(allyl carbonate) of a polyhydroxy alcohol, said polyhydroxy alcohol having from 2 to 20 carbon atoms and from 2 to 6 hydroxy groups in the molecule;

to 10 wt % of at least one radical initiator; and

0–20 wt % of comonomers, at 30–100° C. for 0.5–100 hours, wherein the polymerization casting is carried out in the presence of a cyclohexyl diallyl ester oligomer in an amount of 0.05 to 60 wt %, having the formula I

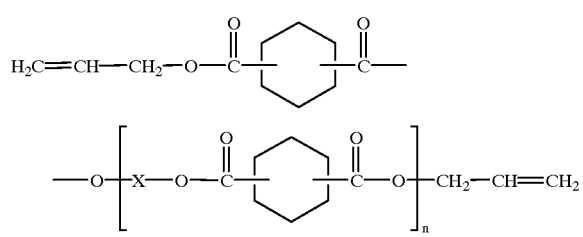

wherein X denotes a divalent hydrocarbon residue derived from a diol having 2–20 carbon atoms, optionally partly replaced by a residue derived from a polyol having 3 or more carbon atoms and 3–10 hydroxy groups, and wherein n=1–100. The poly (allyl carbonates) of polyhydroxy alcohols may be used in the form of either monomers or oligomers. Monomers are usually obtained by using chloroformates. In this way, diethylene glycol diallyl carbonate can be obtained by reacting diethylene glycol bis(chloroformate) with allyl alcohol in the presence of an alkali, as described in Kirk-Othmer, *Encyclopedia of Chemical Technology,* 3rd ed., John Wiley & Sons, 1978, Vol. 2, p. 111. Monomers and oligomers of poly(allyl carbonates) of polyhydroxy alcohols can also be suitably obtained by means of transesterification reactions between diallyl carbonate and a polyhydroxy alcohol, as described in European patent application 0 035 304. In this way, monomers or mixtures of monomers and oligomers can be obtained, depending on the ratio of diallyl carbonate reagents to polyhydroxy alcohol. It is also possible to obtain mixed poly(allyl carbonates) of polyhydroxy alcohols by reacting a diallyl carbonate with a mixture of polyhydroxy alcohols in a transesterification reaction. These mixed poly(allyl carbonates) of polyhydroxy alcohols are also included in the present invention. Monomers of poly(allyl carbonates) of polyhydroxy alcohols are preferred for the ophthalmic lens of the present invention.

The polyhydroxy alcohols used in the preparation of poly(allyl carbonates) of polyhydroxy alcohols contain from 2 to 20 carbon atoms and from 2 to 6 hydroxy groups in the molecule. Examples of these alcohols are: ethylene glycol, diethylene glycol, triethylene glycol, tetraethylene glycol, 1,3-propylene glycol, 1,4-butanediol, 1,6-hexanediol, neopentyl glycol, 2,2,4-trimethyl-1,3-pentanediol, 1,4-dimethanol cyclohexane, 4,8-bis(hydroxyethyl) tricyclo(5, 2,1,0$^{2,6}$)decane, α,α'-xylenediol, 1,4-bis(hydroxyethyl) toluene, 2,2-(bis(4-hydroxyethyl)phenyl) propane, pentaerythritol, trimethylol propane, dipentaerythritol, ditrimethylol propane, and tris(hydroxyethyl) isocyanurate. The following polyhydroxy alcohols are preferred: diethylene glycol, 1,4-dimethanol cyclohexane, pentaerythritol, and tris(hydroxyethyl) isocyanurate. Examples of the diol include ethylene glycol, 1,2-propylene glycol, 1,4-butanediol, 1,6-hexanediol, 1,4-dimethanol cyclohexane, 1,3-butanediol, neopentyl glycol, 1,3-cyclohexanediol, p-xylene glycol, and styrene glycol, and other aliphatic and aromatic diols. Branched diols are preferable to linear ones. Examples of such branched diols include 1,2-propylene glycol, 1,3-butanediol, neopentyl glycol, 2,3-butanediol, 1,4-pentanediol, 1,3-pentanediol, 1,2-pentanediol, 2,3-pentanediol, 2,4-pentanediol, 1,5-hexanediol, 1,4-hexanediol, 1,3-hexanediol, 1,2-hexanediol, 2,3-hexanediol, 2,4-hexanediol, 2,5-hexanediol, and 3,4-hexanediol. Examples of the polyols include aliphatic trihydric alcohols, such as glycerine and trimethylol propane, and aliphatic polyhydric alcohols, such as pentaerythritol and sorbitol.

Comonomers may optionally be present in the curable composition up to 20 wt %. These comonomers may be acrylic, vinylic or allylic. Examples include methyl acrylate, methyl methacrylate, phenyl methacrylate, vinyl acetate, vinyl benzoate, diallyl isophthalate, diallyl terephthalate, diallyl adipate, and triallyl cyanurate.

The compositions of the present invention also contain a polymerization initiator in quantities ranging from 0.01 to 10 wt %. This initiator should be soluble in the other components present in the composition to be cured and capable of producing free radicals at a temperature which ranges from 30° to approximately 100° C. Some unlimitative examples of such initiators are organic peroxide and percarbonate initiators, especially diisopropyl peroxydicarbonate, dicyclohexyl peroxydicarbonate, di-sec-butyl peroxydicarbonate, dibenzoyl peroxide, and tert-butyl perbenzoate. For the purpose of the present invention, it is preferable for the polymerization initiator to be present in the composition in quantities from 1 to 8 wt %.

The composition may also contain one or more conventional additives to act as ultraviolet light absorbers, release agents, dyes, pigments, infrared light absorbers, etc., preferably in quantities not higher than 1 wt %.

According to a third aspect of the present invention there is provided the use of a cyclohexyl diallyl ester oligomer of the formula I

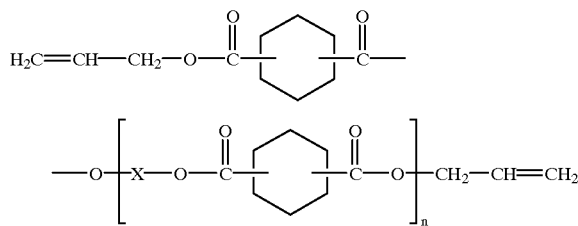

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100, in the production of ophthalmic lenses comprising the cured product of a composition comprising a poly(allyl carbonate) of a polyhydroxy alcohol, said polyhydroxy alcohol having from 2 to 20 carbon atoms and from 2 to 6 hydroxy groups in the molecule, a radical initiator, and, optionally, comonomers, to significantly reduce mould damage and shrinkage during the preparation of the ophthalmic lenses. Preferably, the amount of said diallyl ester oligomer that is to be used in the lenses is sufficient to assure that the shrinkage of the lens is reduced by at least 10%, compared to the shrinkage observed when no diallyl ester oligomer is used. Also, the lenses according to the invention preferably show a shrinkage of less than 20%, more preferably less than 15%, and most preferably less than 12.5%. Shrinkage is determined on the basis of the density difference of the starting monomers and the resulting polymer.

The invention will be further illustrated by the following examples.

Mould damage occurs by adhesion of the cured polymer to the glass mould. It is possible to measure the adhesion of the cured polymer to the glass with the aid of a tensile tester. To this end a monomer composition is polymerized between two parallel glass plates which are held together with a PVC-ring. After polymerization, the PVC-ring is removed and the top glass plate is pulled loose on one side on the tensile tester. This gives a tensile-elongation diagram as shown in FIG. 1, with the force necessary to pull the two glass plates away from each other plotted against the percentage of extension.

A good parameter for the adhesion to the glass mould is the overall release energy (E-total). This is the surface area under the above-mentioned diagram.

EXAMPLES 1 to 4

Comparative Examples A to D

A clear homogeneous solution was obtained by mixing diethyleneglycol bisallyl carbonate (Nouryset 200® ex. Akzo Nobel), cyclohexyl diallyl ester oligomer (CH-AEO, see explanation below) and 2.7 wt. % of diisopropyl peroxy dicarbonate (IPP), the whole mixture being 100%. The mixture was degassed at 20 mbar for 15 minutes until gas evolution stopped. The glass mould assemblies were filled with the mixture. Polymerization took place in an oven with a polymerization cycle of 21 hours at a temperature rising exponentially from 45° to 80° C. In comparative Examples B, C and D instead of CH-AEO, the terephtalate diallyl ester oligomer (Tp-AEO, see explanation below), was used.

CH-AEO=cyclohexyl diallyl ester oligomer, ex Showa Denko, poly[oxy(methyl-1,2-ethanediyl)oxycarbonyl 1,4-cyclohexylcarbonyl] α-[4-((2-propenyloxy)carbonyl) benzoyl]ω-(2-propenyloxy), i.e. the oligomer of formula I:

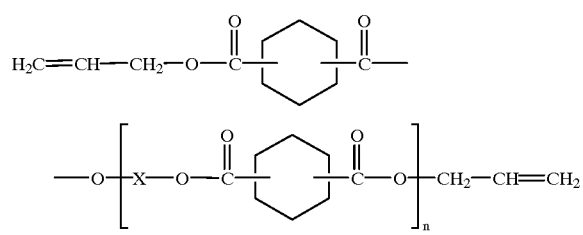

wherein X denotes methyl-1,2-ethanediyl.

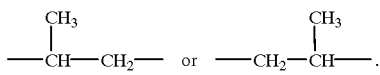

Tp-AEO=diallyl terephthalate oligomer, ex Showa Denko, poly[oxy(methyl-1,2-ethanediyl)oxycarbonyl 1,4-phenylenecarbonyl] α-[4-((2-propenyloxy)carbonyl) benzoyl]ω-(2-propenyloxy)

Table 1 lists the compositions which have been polymerized, mentioning the amount of CH-AEO or Tp-AEO present in the composition and the properties of the resulting lenses, Barcol hardness (BH), the F-open, the E-total and the refractive index (RI).

TABLE 1

| Lens | CH-AEO (wt %) | Tp-AEO (wt %) | BH | F-open (N) | E-total (Joule) | RI |
|---|---|---|---|---|---|---|
| A | 0 | | 30 | 107 | 0.25 | 1.497 |
| 1 | 0.1 | | 30 | 98 | 0.05 | 1.497 |
| 2 | 0.2 | | 29 | 95 | 0.07 | 1.497 |
| 3 | 0.3 | | 28 | 88 | 0.05 | 1.498 |
| 4 | 0.5 | | 28 | 80 | 0.02 | 1.498 |
| B | | 0.2 | 26 | 112 | 0.12 | 1.499 |
| C | | 0.5 | 27 | 87 | 0.09 | 1.500 |
| D | | 1.5 | 27 | 62 | 0.02 | 1.501 |

The results in Table 1 for E-total show that the lenses comprising the compositions of the present invention will result in a significant reduction of demoulding energy, and hence a reduction of mould damage, even at very low concentration of CH-AEO, without adversely affecting other properties such as Barcol hardness and refractive index. The results of the Comparative Examples B to D show that the same degree of mould damage reduction requires 5–10 times as much Tp-AEO. Furthermore, the RI is negatively affected by the presence of this aromatic molecule in the composition.

EXAMPLE 5

Comparative Examples E and F

Compositions were prepared according to the procedure mentioned in Examples 1 to 4. The results are listed in Table 2.

TABLE 2

| Lens | Additive (%) | RI |
|---|---|---|
| E | 0 | 1.497 |
| 5 | 14% CH-AEO | 1.499 |
| F | 14% Tp-AEO | 1.509 |

The results in Table 2 show that the influence of high percentages CH-AEO on the RI is negligible. Whereas high percentages of Tp-AEO changes the RI unacceptably.

EXAMPLE 6

In order to investigate the degree of shrinkage, polymer compositions were prepared, as listed below in Table 3, according to the procedure detailed in examples 1 to 4. The shrinkage data were obtained using density measurements and calculation with the formula:

$$\frac{[\text{density polymer} - \text{density monomer}]}{\text{density polymer}} \times 100\%$$

TABLE 3

| % CH-AEO | % Tp-AEO | Shrinkage |
|---|---|---|
| 0 | 0 | 12.3% |
| 1.5 | — | 12.4% |
| 3 | — | 12.3% |
| 8 | — | 11.7% |
| 14 | — | 11.2% |
| 30 | — | 9.9% |
| 50 | — | 8.8% |
| — | 0.3 | 12.2% |
| — | 1.5 | 12.2% |
| — | 3 | 12.0% |
| — | 14 | 11.1% |
| — | 30 | 9.8% |

The invention is not limited to the above description, the requested rights are rather determined by the following claims.

What is claimed is:

1. An ophthalmic lens comprising the cured product of a composition comprising:

60–99 wt % of a poly(allyl carbonate) of a polyhydroxy alcohol, said polyhydroxy alcohol having from 2 to 20 carbon atoms and from 2 to 6 hydroxy groups in the molecule;

0.01–10 wt % of at least one radical initiator;

0–20 wt % of comonomers; and a cyclohexyl diallyl ester oligomer in an amount of 0.05 to 20 wt %, having the formula I

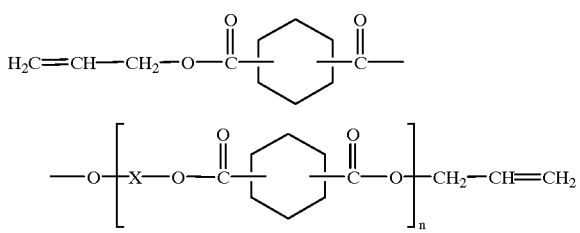

wherein X denotes a divalent hydrocarbon residue derived from a diol having 2–20 carbon atoms, optionally partly replaced by a residue derived from a polyol having 3 or more carbon atoms and 3–10 hydroxy groups, and n=1–100.

2. Ophthalmic lens according to claim 1, wherein the cyclohexyl diallyl ester oligomer is present in said composition in an amount of up to 15 wt %.

3. Ophthalmic lens according to claim 1, wherein the cyclohexyl diallyl ester oligomer is present in the composition in an amount of 0.05 to 5 wt %.

4. Ophthalmic lens according to claim 1, wherein X denotes the following groups:

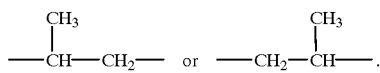

5. Ophthalmic lens according to claim 1, having a refractive index of 1.497 to 1.505.

6. Ophthalmic lens according to claim 1, having a Barcol hardness of at least 28.

7. Ophthalmic lens according to claim 1, wherein the polyallyl carbonate of polyhydroxy alcohol is present in the composition in the form of a monomer.

8. Ophthalmic lens according to claim 7, wherein the monomer of polyallyl carbonate of polyhydroxyl alcohol is diethylene glycol bisallyl carbonate.

9. Ophthalmic lens according to any of the previous claims, wherein the radical initiator is diisopropylperoxy dicarbonate.

10. Ophthalmic lens according to claim 1 exhibiting a shrinkage less than 20%.

11. Process for the production of ophthalmic lenses with a refractive index of 1.497 to 1.505 comprising polymerization casting of a curable composition comprising:

60–99 wt % of at least one poly(allyl carbonate) of a polyhydroxy alcohol, said polyhydroxy alcohol having from 2 to 20 carbon atoms and from 2 to 6 hydroxy groups in the molecule;

to 10 wt % of at least one radical initiator; and

0–20 wt % of comonomers, at 30–100° C. for 0.5–100 hours, wherein the polymerization casting is carried out in the presence of a cyclohexyl diallyl ester oligomer in an amount of 0.05 to 20 wt %, having the formula I

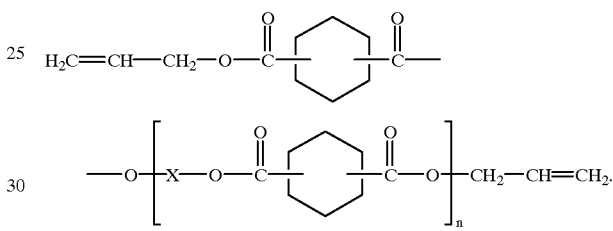

12. Ophthalmic lens according to any of the claims 1–10 obtainable by the process of claim 11.

* * * * *